March 18, 1930.     H. M. LEONARD     1,751,281
ENGINE
Filed June 29, 1927

INVENTOR
HOWARD M. LEONARD
BY
M. W. McConkey
ATTORNEY

Patented Mar. 18, 1930

1,751,281

UNITED STATES PATENT OFFICE

HOWARD M. LEONARD, OF SOUTH BEND, INDIANA, ASSIGNOR TO GERNANDT MOTOR CORPORATION, OF CHICAGO, ILLINOIS, A CORPORATION OF ILLINOIS

ENGINE

Application filed June 29, 1927. Serial No. 202,263.

This invention relates to engines, more especially those of the injection type, and has for an object the provision of means for operating such an engine at the most efficient compression.

In engines of this type, where the firing of the fuel charge depends on the heat of compression, a very high compression must be provided for starting, when the engine is cold, whereas a much lower compression is sufficient after the engine is warmed up. An important feature of the invention is to be found in the provision of novel means for varying the compression, by increasing or decreasing the volume of the compression and combustion space of the engine, the means for varying the compression preferably being readily operable while the engine is running.

I prefer to provide for this purpose a novel device including a series of chambers (one of which is illustrated as being adjustable as to volume), which can be connected to or disconnected from the engine compression space to vary its volume. These chambers may be arranged in an arc, with a common control valve of novel construction arranged substantially at the center of the arc.

The above and other objects and features of the invention, including various novel combinations of parts and desirable particular constructions, will be apparent from the following description of one illustrative embodiment shown in the accompanying drawing, in which.

Figure 2:
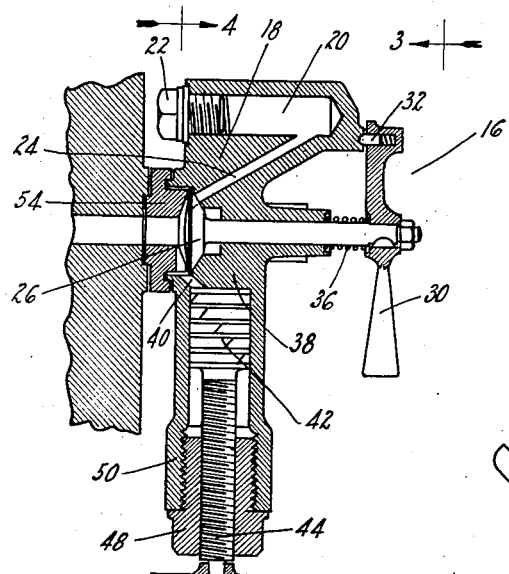
Figure 2 is a sectional view through the novel compression-varying device which appears in side elevation in Figure 1, but on a larger scale.
Figure 3:
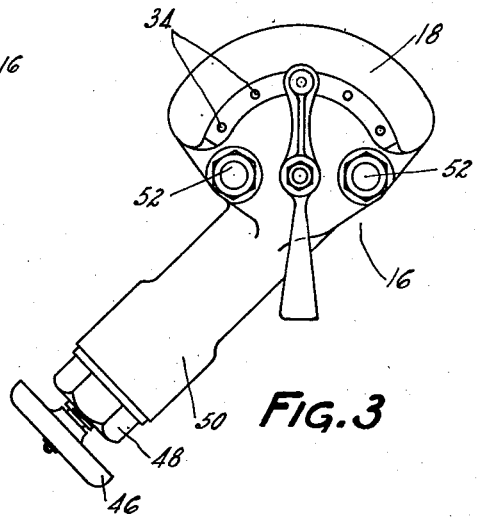
Figure 3 is an elevation of the compression-varying device, looking in the direction of the arrows 3—3 of Figure 2.
Figure 4:
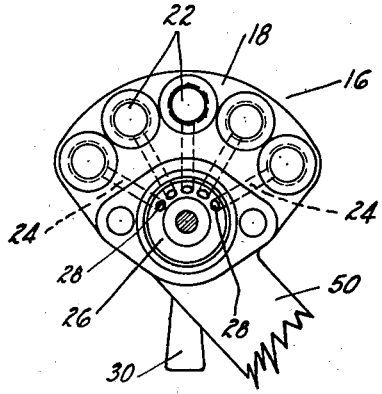
Figure 4 is an elevation of this device, looking in the direction of the arrows 4—4 of Figure 2.
Figure 1:
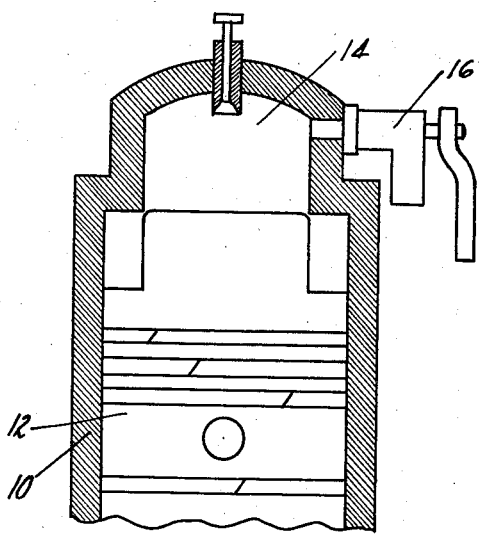
Figure 1 is a section through the engine cylinder.

The illustrated engine includes a cylinder 10 and piston 12, of a novel form designed to give great turbulence in the compression and combustion space 14 at the end of the compression stroke of the piston. A fuel-injecting device 16, of any desired character, opens into the space 14, as does also a novel compression-varying device indicated as a whole by the reference character 16.

The novel compression-varying device 16, in the form illustrated, includes a body 18, formed with an arcuate series of chambers 20, each closed by a threaded plug 22 or the like, and each having a passage 24 leading toward the center of the arc. Passages 24 are controlled by an angularly-movable mushroom valve 26, formed with openings 28 corresponding to the passages.

On the stem of valve 26 is keyed an operating handle 30 having a spring-pressed plunger 32 seating in one or another of a series of depressions 34 corresponding to the chambers 20. A spring 36, confined between handle 30 and the body portion 18, urges valve 26 against its seat.

I prefer to provide a separate chamber 38 having its passage 40 opening beyond the valve 26, so that this chamber is continuously in communication with the compression and combustion space 14, and which separate chamber is itself adjustable as to volume. In the illustrated arrangement it contains a piston or plunger 42 adjusted by a worm or threaded stem 44 having a hand wheel 46, and threaded through a plug 48 which in turn is threaded into an extension 50 in which the chamber 38 is formed.

The entire device is secured to the engine by bolts 52, an adapter or gasket 54 being interposed if desired.

In operation, plunger 42 is adjusted to give the lowest compression at which the engine will operate efficiently when cold, at which time all of the chambers 20 are disconnected from the space 14. As the engine warms up, handle 30 is turned to connect one after the other of the chambers 20 to the space 14, to reduce the compression pressure so that at all times it is as low as possible without interfering with the efficient operation of the engine.

The above-described device can also be manipulated to change the time during the cycle of movement of piston 12 at which the fuel charge is ignited.

While one illustrative embodiment has been described in detail, it is not my intention to limit the scope of the invention to that particular embodiment, or otherwise than by the terms of the appended claims.

I claim:

1. An injection-type engine having a cylinder and piston defining a compression and combustion space above the piston, in combination with a compression-varying device including a series of chambers of varying size, and means for connecting various numbers of said chambers to said space while the engine is running.

2. An injection-type engine having a cylinder and piston defining a compression and combustion space above the piston, in combination with a compression-varying device including a series of chambers, and means for connecting various numbers of said chambers to said space.

3. An injection-type engine having a cylinder and piston defining a compression and combustion space above the piston, in combination with a compression-varying device including a series of chambers, a member adjustable in one of said chambers for varying its size, the remaining chambers being of fixed size, and means for connecting various ones of said fixed size chambers to said space, the adjustable chamber being continuously in communication with said space.

4. A compression-varying device comprising, in combination with an engine having a cylinder, a series of chambers arranged in an arc, and a valve movable through an angle corresponding to said arc for connecting and disconnecting said chambers from said cylinder.

5. A compression-varying device comprising, in combination with an engine having a cylinder, a series of chambers arranged in an arc, and a valve at the center of said arc and movable to connect and disconnect said chambers from said cylinder.

6. A compression-varying device comprising, in combination with an engine having a cylinder, a series of chambers arranged in an arc, and a valve at the center of said arc and movable to connect and disconnect said chambers from said cylinder, together with another chamber having means for varying its volume to provide, with said series of chambers, a vernier adjustment of the compression space in said cylinder.

7. An engine having two compression-varying means, one including an adjustable chamber in continuous communication with the engine, and the other having chambers of fixed size arranged to be connected to the engine.

8. An engine having a compression and combustion space and a series of compression chambers communicating therewith through an intermediate chamber, and a valve adjustable in said intermediate chamber controlling the communication of each compression chamber in said series with the compression and combustion space.

9. An engine having a compression and combustion space and a series of compression chambers communicating therewith through an intermediate chamber, a valve adjustable in said intermediate chamber controlling the communication of each compression chamber in said series with the compression and combustion space, and a separate compression chamber provided with means for varying its capacity communicating through said intermediate chamber with the compression and combustion space independently of the valve located in the intermediate chamber.

10. An engine having a compression and combustion space and a series of compression chambers communicating therewith through an intermediate chamber and a valve rotatable within said intermediate chamber to connect one or more of the compression chambers of said series with the compression and combustion space.

11. An engine having a compression and combustion space, a compression chamber variable as to capacity communicating therewith through an intermediate chamber, a plurality of compression chambers fixed as to capacity communicating therewith through said intermediate chamber, and means located within the intermediate chamber controlling the communication of the compression chambers fixed as to capacity with the compression and combustion space.

In testimony whereof, I have hereunto signed my name.

HOWARD M. LEONARD.